United States Patent
Brocard et al.

(10) Patent No.: US 8,549,863 B2
(45) Date of Patent: Oct. 8, 2013

(54) DEVICE FOR SUPPLYING FUEL TO A GAS TURBINE ENGINE WITH REGULATED FUEL FLOW RATE

(75) Inventors: Jean-Marie Brocard, Rubelles (FR); Regis Deldalle, Servon (FR); Philippe Galozio, Lieusaint (FR); Michel Martini, Ponthierry (FR); Alain Varizat, Bois le Roi (FR)

(73) Assignee: SNECMA, Paris (FR)

( * ) Notice: Subject to any disclaimer, the term of this patent is extended or adjusted under 35 U.S.C. 154(b) by 911 days.

(21) Appl. No.: 11/816,535

(22) PCT Filed: Feb. 17, 2006

(86) PCT No.: PCT/EP2006/060074
§ 371 (c)(1),
(2), (4) Date: Mar. 6, 2008

(87) PCT Pub. No.: WO2006/087378
PCT Pub. Date: Aug. 24, 2006

(65) Prior Publication Data
US 2008/0163931 A1    Jul. 10, 2008

(30) Foreign Application Priority Data
Feb. 17, 2005   (FR) ...................................... 05 01641

(51) Int. Cl.
F02C 9/28 (2006.01)

(52) U.S. Cl.
USPC ............................ 60/779; 60/39.281; 60/239

(58) Field of Classification Search
USPC ......... 60/39.091, 779, 39.281, 734, 243, 239, 60/223
See application file for complete search history.

(56) References Cited

U.S. PATENT DOCUMENTS

| 4,280,323 | A | | 7/1981 | Jersey et al. |
| 4,508,127 | A | * | 4/1985 | Thurston ........................... 137/8 |
| 4,637,420 | A | * | 1/1987 | Dyer .............................. 137/242 |
| 6,655,126 | B2 | * | 12/2003 | Walker et al. ................... 60/243 |
| 2004/0117102 | A1 | | 6/2004 | Weir et al. |

FOREIGN PATENT DOCUMENTS

| EP | 0 377 292 | 7/1990 |
| EP | 1 355 054 | 10/2003 |
| FR | 2 818 691 | 6/2002 |

OTHER PUBLICATIONS

U.S. Appl. No. 11/816,586, filed Aug. 17, 2007, Brocard, et al.

* cited by examiner

Primary Examiner — Andrew Nguyen
(74) Attorney, Agent, or Firm — Oblon, Spivak, McClelland, Maier & Neustadt, L.L.P.

(57) ABSTRACT

A fuel supply device includes a fuel supply pipe receiving fuel at a non-regulated pressure delivered by a pump, a device for measuring the flow rate of fuel in the pipe, a first controlled variable-restriction valve mounted in the supply pipe, a control system connected to the flow rate measurement device and to the first valve to control the valve to deliver fuel to the engine at a desired flow rate under normal operating conditions of the engine, a second controlled variable-restriction valve mounted in the supply pipe in series with the first valve, and a control for controlling the second valve to enable the engine to be supplied with fuel at an adjustable, reduced flow rate in response to detecting over-speed or over-thrust of the engine.

8 Claims, 2 Drawing Sheets

DEVICE FOR SUPPLYING FUEL TO A GAS TURBINE ENGINE WITH REGULATED FUEL FLOW RATE

BACKGROUND OF THE INVENTION

The invention relates to a device for supplying fuel at a regulated flow rate to an engine, in particular an airplane gas turbine engine.

A device for supplying fuel to a gas turbine engine usually comprises a volumetric pump driven by the engine via an accessory gear box coupled to a shaft of the engine. The volumetric pump receives fuel coming from a fuel circuit of the airplane. An electro-hydraulic controlled metering valve is mounted in a supply pipe connecting the outlet from the volumetric pump to a combustion chamber of the engine. A fuel return circuit with a controlled variable-restriction bypass valve is connected between the outlet and the inlet of the volumetric pump. The bypass valve is controlled hydraulically to maintain the head loss through the metering valve at a value that is constant or almost-constant, enabling fuel to be delivered at a desired rate corresponding to the position of the metering valve. An engine over-speed or over-thrust valve can be mounted in the supply pipe in series or in parallel with the metering valve to cause the fuel flow rate to be decreased in response to detecting an excessive speed or thrust that might arise due to a failure of the metering valve or of its control. A cutoff valve is generally provided in series with the metering valve and the over-speed valve to turn off the engine by interrupting its fuel supply on direct command from the cockpit. Reference can be made in particular to documents EP 1355054 and US 2004/0117102.

In the embodiment of document EP 1355054, the over-speed or over-thrust valve is a valve having two operating states: a fully-open state under normal conditions, and a state of predetermined greater restriction in response to over-speed or over-thrust being detected. Such a disposition presents the drawback, after over-speed or over-thrust has been detected, of losing thrust from the engine or of imposing a reduced volume flow rate of fuel that might not be acceptable for the engine under certain operating conditions.

Document EP 0377292 describes a device for supplying fuel to a gas turbine. The fuel (a compressible gas) is delivered by a compressor that regulates its flow rate under normal conditions. Two valves are mounted in series in a supply pipe between the gas compressor and the injectors of the turbine. Those valves are in the fully-open position under normal conditions to avoid head losses and they are controlled under transient conditions (when starting) or in the event of sudden off-loading to regulate respectively the pressure and a reduced flow rate.

Document U.S. Pat. No. 4,280,323 describes a device for supplying a gas turbine with fuel that includes an over-speed valve and a regulator valve connected in series. The pressure of the fuel delivered by the pump is increased so as to conserve a desired pressure at the injectors of the turbine in spite of the fuel having greater viscosity when cold (on starting). That action is simply of the type that is programmed to match a correlation relationship, and has no regulation loop.

OBJECT AND SUMMARY OF THE INVENTION

An object of the invention is to provide a supply device for supplying fuel to a gas turbine engine, which device presents improved operation, and to this end, the invention provides a device comprising:

a pipe for supplying fuel to the engine;
a pump connected to the supply pipe and delivering it with fuel at a pressure that is a function of engine speed;
a flow rate measuring device for measuring the fuel flow rate in the supply pipe;
a first controlled variable-restriction valve connected in the supply pipe;
a first control circuit connected to the flow rate measurement device and to the first valve to control the valve to deliver a regulated desired fuel flow rate under normal operating conditions of the engine;
a second controlled variable-restriction valve mounted in the supply pipe in series with the first valve; and
a second control circuit connected to the second valve to reduce the flow rate of fuel in the supply pipe in response to detecting over-speed or over-thrust of the engine, while conserving capacity for adjusting the flow rate.

Thus, the first valve regulates the flow rate of the fuel in a normal operation mode of the engine, while the second valve, or over-speed valve, can take over from the first valve and can continue providing flow rate regulation after over-speed has been detected.

The flow rate measurement device may be a mass flow meter, and the control system may include a local servo-control circuit receiving a setpoint value for the mass flow rate from an automatic regulation system of the engine.

In a variant, the flow rate measurement device is a volumetric flow meter.

Still in a variant, the flow rate measurement device is a device that enables flow rate to be measured on the basis of knowledge of the pressure drop and the flow section through the device.

According to a particular feature of the regulator device, the first valve is an electrically-controlled direct-control valve. The first control circuit can then include at least one electromechanical actuator for controlling the degree to which the first valve is opened, and a servo-control loop receiving a signal delivered by the flow rate measurement device and representative of the real fuel flow rate, receiving a setpoint signal representative of the desired fuel flow rate and delivering a control signal to the actuator as a function of the difference detected between the real and desired flow rate. The servo-control loop can be implanted locally in the vicinity of the first valve and can be external to the electronic regulation system of the engine that delivers the setpoint signal. The mechanical actuator may be pre-positioned on starting the engine and the valve may include a slot that co-operates with a characteristic for the pressure delivered by the pump on starting so as to servo-control the fuel flow rate on starting.

The second valve may also be a direct-control valve controlled electrically by means of at least one electromechanical actuator.

A third valve may also be provided for interrupting fuel flow that is mounted in the supply pipe in series with the first and second valves.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS OF THE INVENTION

Figure 1:
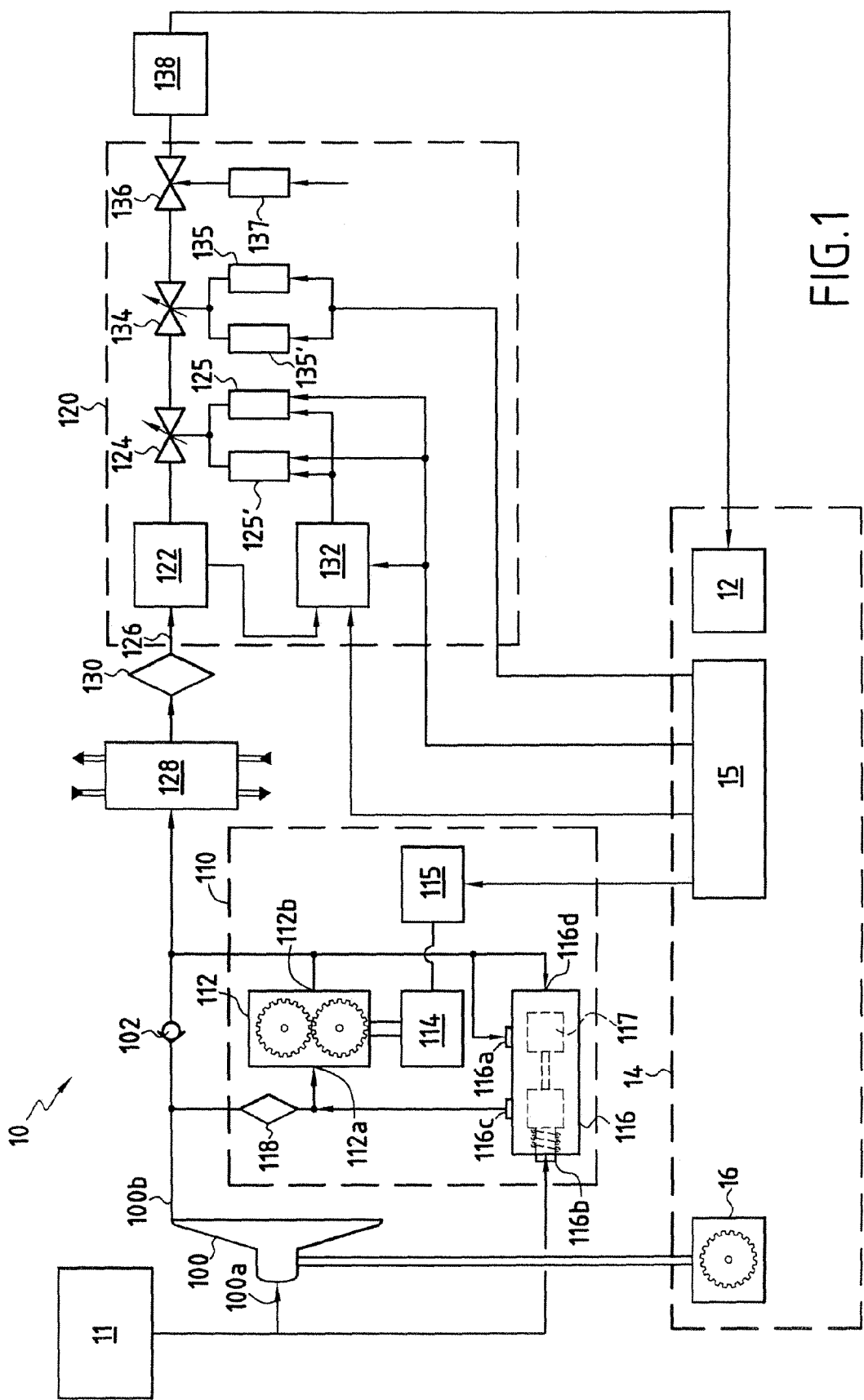
FIG. 1 shows an embodiment of a fuel supply device fitted with a regulator circuit in accordance with the invention.

The fuel supply circuit 10 of FIG. 1 receives fuel from a fuel circuit 10 of an airplane and delivers a flow of fuel to an injector system 12 for injecting fuel into a gas turbine combustion chamber of an engine 14 fitted to the airplane.

The circuit 10 comprises a centrifugal pump 100 constituting the main pump of the circuit. The pump 100 has an inlet 100a connected to the fuel circuit 11, and a high pressure outlet 100b delivering fuel at a pressure that is a function of the speed of rotation of the pump. The pump is driven by a mechanical connection with the accessory drive module 16 of the engine 14 and coupled to the turbine thereof.

An assistance pump unit 110 comprises a positive-displacement pump 112 having an inlet 112a connected to the outlet of the centrifugal pump 100, an electric motor 114 for driving the pump 112 under the control of an electric control circuit 115, and a pressure release valve 116.

By way of example, the pump 112 is a gear pump. A filter 118 can be mounted between the outlet 100b of the pump 100 and the inlet 112a of the pump 112 to protect it against solid particles that might be conveyed by the fuel coming from the circuit 11. The operation of the centrifugal pump 100 is not affected by such particles.

The electric control circuit 115 is connected to a full authority digital engine control (FADEC) module 15 for controlling the engine 14 in order to control operation of the pump 112. The control circuit 115 could also be integrated in the regulation module 15.

The pressure release valve 116 has a first inlet 116a connected to the outlet 112b of the pump 112, a second inlet 116b connected to the airplane fuel circuit and providing a reference pressure to the valve 116, and an outlet 116c connected to the inlet 112a of the pump 112. The pressure release valve is adjusted to open and put the first inlet 116a into communication with the outlet 116c when the pressure difference between the inlets 116a and 116b exceeds a predetermined threshold. To make the valve 116, it is possible to use a slider 117 that is subjected at one end to the outlet pressure from the pump 112 via a pressure takeoff 116d, and at an opposite end to the pressure at the second inlet 116b plus a force exerted by a spring.

The outlet 100b of the centrifugal pump 100 is connected via a check valve 102 to the inlet of a circuit 120 for regulating the flow rate of fuel delivered to the fuel injector system 12, while the outlet 112b of the pump 112 is connected to the inlet of the regulator circuit 120.

Operation is as Follows.

The pressure release valve 116 is set to open at a pressure corresponding to a predetermined minimum pressure Pm enabling the minimum fuel requirement of the engine 14 to be satisfied on starting.

The positive-displacement pump 112 is started and driven at a speed suitable for delivering fuel at a rate that exceeds the initial need of the engine 14 as set by the regulation circuit 120, such that the pressure at the outlet 112b of the pump 112 reaches the minimum pressure Pm almost instantaneously, thereby causing the pressure release valve 116 to open. The pressure at the outlet 100b of the centrifugal pump begins to increase on the engine 14 starting but does not initially cover the fuel pressure requirement. The pressure at the outlet 112b of the pump 112 is then set at the pressure value Pm, the fuel supplied by the pump 112 and not delivered to the injector circuit 12 then flowing in a closed circuit between the outlet and the inlet of the pump 112 via the valve 116. The check valve 102 prevents return of the fuel delivered by the pump 112 to the centrifugal pump 100.

The pump unit 110 thus provides an assistance function on starting, the valve 116 enabling the positive-displacement pump 112 to be converted into a pump that delivers fuel at a pressure, in the same manner as a centrifugal pump. Nevertheless, unlike that which can happen with a centrifugal pump, the operation of the positive-displacement pump 112 is unaffected by the presence of air or vapor in the fuel taken initially from the circuit 11.

The pressure at the outlet from the pump 100 increases with increasing engine speed, and when said pressure exceeds the value Pm, the check valve 102 opens. The pressure supplied to the flow rate regulation circuit 120 is then that supplied by centrifugal pump 100.

The assembly comprising the pump 100, the pump unit 110, and the check valve 102 behaves like a pumping system that enables a preponderant transition to be obtained between the pumps 112 and 100, the pressure of the fuel delivered to the regulator circuit being the greater of the pressures delivered in parallel at the outlet from the pumps 112 and 100.

Once the pump 100 has taken over from the pump 112, the pump 112 can be stopped. Stopping may be controlled in response to a pressure threshold $P_1$ being exceeded at the outlet from the pump 100, or in response to a speed threshold $V_1$ of the engine 14 being exceeded. This can be controlled by the electronic regulation module 15 acting on the electric control circuit 115 in response to information supplied by a fuel pressure sensor or by a sensor for sensing the speed of the turbine of the engine 14. The thresholds $P_1$ and $V_1$ may be selected to correspond to a value a little greater than Pm.

It should be observed that the pump unit 110 can be used not only on starting, but also during other stages of engine operation, e.g. when idling or when operating slowly under circumstances in which the centrifugal pump 100 becomes incapable of delivering fuel at the minimum pressure Pm. It then suffices to restart the motor 114 by the control circuit 115 if the fuel pressure is detected as dropping below a certain pressure threshold or if the speed of the engine is detected as dropping below a certain speed threshold.

The pump unit 110 then behaves not only like an assistance unit on starting, but also as an assistance unit at low engine speeds so as to ensure that the minimum pressure at which fuel is supplied under any circumstances is a sufficient pressure.

In the embodiment shown, the pump 112 is connected to the fuel circuit 11 via the centrifugal pump which is "transparent" for the starting pump 112. This connection enables the pump 112 to benefit from the increase in pressure caused by the pump 100 as soon as it begins to be driven.

It would naturally be possible to connect the inlet 112a of the pump 112 to the fuel circuit 11 via a filter, without passing through the centrifugal pump 100.

The regulation circuit 120 for regulating the fuel flow rate receives fuel delivered by the pump 100 at a pressure that is not regulated and that depends on the speed of the engine. It comprises a mass flow meter 122 and a direct-control fuel valve 124 mounted in a pipe 126 connecting the pump 100 and the assistance pipe unit 110 to the fuel injector device 12. The flow meter 122 is preferably mounted upstream from the valve 124. Both a heat particle filter 130 and a heat exchanger circuit 128 for exchanging heat between oil for lubricating members of the engine and the fuel can be inserted in the pipe 110 upstream from the flow meter 122, such heat exchanger circuits and filter being well known.

By way of example, the valve 124 is an electrically-controlled direct-control valve. The extent to which the valve is opened is controlled by means of an electromechanical actuator 125 such as an actuator or an electric motor. The actuator 125 receives an electrical power supply from an electricity circuit of the engine 14, e.g. from a power supply integrated in the electronic regulation system 15 of the engine or from an electricity power supply bus of the engine 14. For redundancy purposes, two similar actuators 125, 125' may be provided that operate in parallel.

A local servo-control loop 132 fed from an electricity circuit of the engine receives an electric signal delivered by the mass flow meter 122 and representative of the real mass flow rate of fuel in the pipe 126, and an electric signal delivered by the electronic regulation module 15 of the engine and representative of the desired setpoint value for the mass flow rate to be delivered to the engine 14. The servo-control loop 132 delivers a control electric signal to the actuator 125 that depends on the difference detected between the real and setpoint mass flow rates so as to position the valve 124 to regulate the flow rate on the desired setpoint value under normal operating conditions of the engine. The same control signal is delivered in parallel to the actuator 125', if present.

Naturally, regulation could be provided by an electronic module integrated in the automatic regulation system 15 of the engine 14. The use of a local loop 132 external to the housing of said system nevertheless serves to avoid having a connection between the latter and the flow meter 122.

The valve 124 may be of the type described in U.S. Pat. No. 6,367,768, in which operation includes a mode of pre-positioning the actuator. The actuator includes position measurement (absolute direct position or incremental position) and the valve has a slot of determined profile. A possibility of regulating the flow rate when starting the engine, in pre-positioning mode, is made available in association with the flow rate characteristic delivered by the pumping unit 110 with the pressure release valve 116. The flow rate can then be regulated in redundant manner with the flow meter so as to make regulation reliable at very low rates, in the event of the technology of the flow meter not being sufficient.

An over-speed or over-thrust protection valve 134 for the engine 14 is mounted in the pipe 126 downstream from the valve 124. It is possible advantageously to use a directly-controlled valve with an electromechanical actuator 135, in a manner similar to the valve 124 and the actuator 125. The actuator 135 is controlled from the automatic regulation system 15 of the engine 14 via a module that is distinct from the module dedicated to performing regulation by means of the valve 124, for safety reasons. Indeed, engine over-speed or over-thrust can arise from a failure of the valve 124 or of its control means, leaving the valve in its fully open position. For redundancy purposes, two similar actuators 135, 135' may be provided that operate in parallel.

At normal engine speeds, in compliance with the setpoint, the valve 134 is in its maximally open position and the flow rate is controlled by the valve 124.

The electronic regulation module 15 of the engine receives information representative of the speed of the engine, e.g. information representative of the speed of rotation of the high pressure turbine. When an over-speed (or over-thrust) state is detected, i.e. a speed exceeding the speed setpoint value by more than a determined difference, and when that cannot be corrected by acting on the valve 124, the valve 134 is controlled so as to reduce the flow rate of fuel in the pipe 126.

The automatic regulation system 15 can be programmed to bring the valve 134 into a predetermined partially closed position that is safe, enabling fuel to be supplied at a lower rate. The use of a directly-controlled valve for the valve 134 is then advantageous in that it makes it possible to ensure that the engine continues to be controllable by modifying fuel flow rate, at least over a reduced range. This modification can be performed by the automatic regulation system 15 as a function of a desired engine speed. Thus, on detecting over-speed, the valve 134 takes over from the valve 124 and continues to allow flow rate to be varied, at least over a certain range.

Compared with prior art systems in which the operation of the over-speed valve is operation having two states: (i) fully open; and (ii) cut off or open at a predetermined reduced amount; the possibility of regulating flow rate after over-speed or over-thrust has been detected enables thrust from the engine to be conserved and makes it possible to avoid a situation in which an imposed reduced flow rate can be unacceptable for the engine under certain conditions.

An on/off type closure valve 136 is mounted in the pipe 126, e.g. downstream from the valve 134. The valve 136 may be controlled by an electromechanical actuator 137. In known manner, the closure valve 136 can be actuated on command from the automatic regulation system 15 of the engine, or on a priority basis, from the airplane cockpit in order to turn off the engine 14 by interrupting its fuel supply.

Also in known manner, a metering mass flow meter 138 can be mounted in the pipe 126 downstream from the valve 136 to provide information about the total consumption of the engine in terms of weight of fuel.

The fuel requirement of an engine is expressed in terms of weight. Using the mass flow meter 122 thus makes it possible, within the limit of its margin of error, to regulate accurately the supply of fuel on the basis of a setpoint value for mass flow rate. The mass flow meter may be of the type described in documents US 2004/0123674 and US 2004/0129088.

Figure 2:
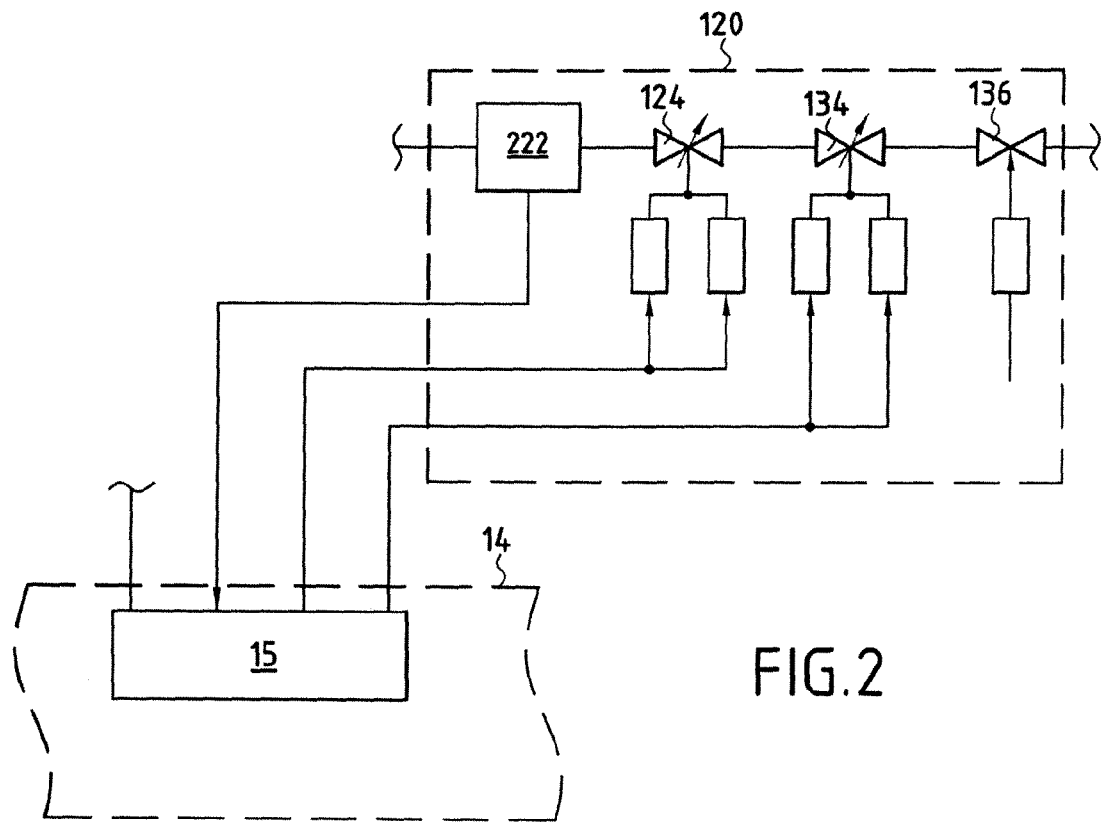
FIGS. 2 and 3 are fragmentary diagrams showing variant embodiments of the FIG. 1 regulator circuit.

As shown in FIG. 2, it is nevertheless possible to replace the mass flow meter by a volumetric flow meter 222. The information concerning the real volume flow rate as measured by the flow meter 222 is transmitted to the automatic regulation system 15 of the engine 14. The system 15 is programmed to convert the requirements of the engine in terms of setpoint volume flow rate from an estimated value for the density of the fuel. The directly-controlled valve 124 is then controlled by the system 15 to servo-control the volume flow rate in the pipe 126 on the desired setpoint value.

Figure 3:
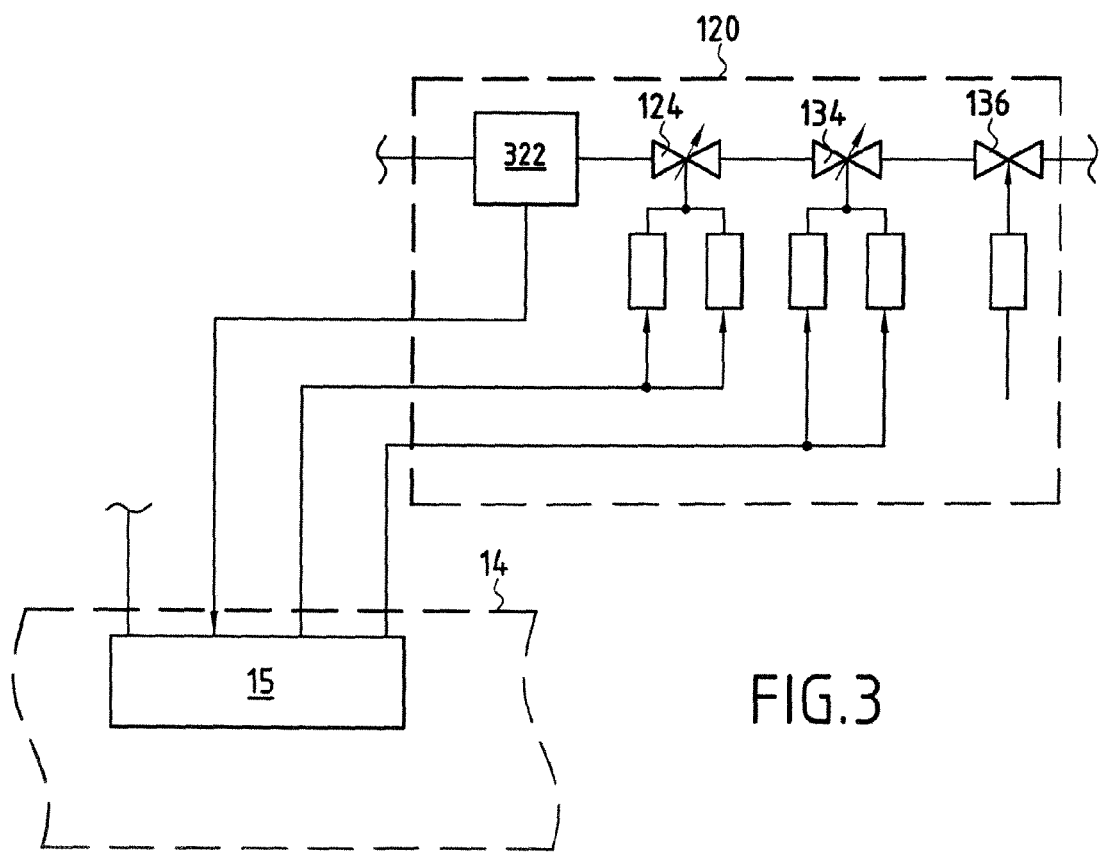

In yet another embodiment, as shown in FIG. 3, it is possible to use a device 322 that enables the flow rate to be measured on the basis of knowing the pressure drop ΔP through the device 322, the flow section for fuel through the device 322, and the density of the fuel. The flow rate is determined by a sensor (not shown) measuring the position of a valve through which head loss is set by a spring.

It should be observed that the device 322 is itself known. Reference can be made to document EP 1 344 917. The device 322 is also of structure analogous to that of hydraulic metering valves used in known systems for supplying fuel to airplane engines, such as that of document EP 1 355 054.

In the foregoing description, use of electrically-controlled valves 124, 134, 136 is contemplated. As a variant, hydraulically-controlled valves could be used.

Furthermore, the above-described supply device may be used for aircraft engines other than gas turbine airplane engines, for example for helicopter engines.

The invention claimed is:
1. A supply device for supplying fuel at a regulated flow rate to a gas turbine engine, the device comprising: a supply pipe for supplying fuel to the engine;

a pump connected to the supply pipe and delivering the supply pipe with fuel at a pressure that is a function of engine speed;

a flow rate measuring device for measuring the fuel flow rate in the supply pipe;

a first controlled variable-restriction valve connected in the supply pipe;

a first control circuit connected to the flow rate measurement device and to the first valve to control the first valve to deliver a regulated desired fuel flow rate under normal operating conditions of the engine, the first control circuit comprising at least one first electromechanical actuator for controlling a degree to which the first valve is opened;

a second controlled variable-restriction valve mounted in the supply pipe in series with the first valve; and a second control circuit connected to the second valve, the second control circuit comprising at least one second electromechanical actuator for controlling the second valve and being configured to reduce the flow rate of fuel in the supply pipe in response to detecting over-speed or over-thrust of the engine, by bringing the second valve into a predetermined partially closed position, and to control thereafter regulation of the fuel flow rate via the second valve over at least a reduced range by modifying the fuel flow rate as a function of a desired engine speed, hereby conserving controllability of the engine, the at least one second electromechanical actuator being controlled from an automatic regulation system of the engine via a second module that is distinct from a first module dedicated to performing regulation by means of the first valve, wherein the second module controls the regulation of the fuel flow rate over the reduced range based on a difference detected between the measured flow rate and a setpoint flow rate so as to position the second valve to regulate the flow rate on a desired setpoint value after the second valve is brought into the predetermined partially closed position in response to detecting over-speed or over-thrust of the engine.

2. A device according to claim 1, wherein the flow rate measurement device is a mass flow meter and the first control circuit includes a local servo-control circuit receiving a mass flow rate setpoint value from the automatic regulation system of the engine.

3. A device according to claim 1, wherein the flow rate measurement device is a volumetric flow meter.

4. A device according to claim 1, wherein the flow rate measurement device is a device for measuring flow rate on the basis of knowledge of a pressure drop and flow section through the measurement device.

5. A device according to claim 1, wherein the first control circuit comprises a servo-control loop receiving a signal delivered by the flow rate measurement device and representative of a real fuel flow rate, receiving a setpoint signal representative of the desired fuel flow rate, and delivering a control signal to the at least one first electromechanical actuator as a function of the difference detected between the real and desired flow rate.

6. A device according to claim 5, wherein the servo-control loop is a loop implanted locally in a vicinity of the first valve and external to an electronic regulation system of the engine supplying the setpoint signal.

7. A device according to claim 5, wherein the at least one first electromechanical actuator can be pre-positioned on starting of the engine and the first valve includes a slot co-operating with a pressure characteristic delivered by the pump on starting so as to servo-control the fuel flow rate on starting.

8. A device according to claim 1, further comprising a cutoff, third valve mounted in the supply pipe in series with the first and second valves.

* * * * *